(12) United States Patent
Lund et al.

(10) Patent No.: US 12,212,274 B2
(45) Date of Patent: Jan. 28, 2025

(54) METHOD FOR REDUCING HIGH TORQUE LEVELS AND TORQUE GRADIENTS IN WIND TURBINE GENERATORS

(71) Applicant: VESTAS WIND SYSTEMS A/S, Aarhus N (DK)

(72) Inventors: Torsten Lund, Fredericia (DK); Hamid Soltani, Silkeborg (DK); Gert Karmisholt Andersen, Hovedgård (DK); Germán Claudio Tarnowski, Aarhus N (DK)

(73) Assignee: VESTAS WIND SYSTEMS A/S, Aarhus (DK)

( * ) Notice: Subject to any disclaimer, the term of this patent is extended or adjusted under 35 U.S.C. 154(b) by 13 days.

(21) Appl. No.: 18/040,640

(22) PCT Filed: Aug. 3, 2021

(86) PCT No.: PCT/DK2021/050253
§ 371 (c)(1),
(2) Date: Feb. 3, 2023

(87) PCT Pub. No.: WO2022/028660
PCT Pub. Date: Feb. 10, 2022

(65) Prior Publication Data
US 2024/0014753 A1  Jan. 11, 2024

(30) Foreign Application Priority Data
Aug. 6, 2020  (DK) .............. PA 2020 70515

(51) Int. Cl.
*H02P 9/00* (2006.01)
*H02P 9/04* (2006.01)
(Continued)

(52) U.S. Cl.
CPC ............... *H02P 9/04* (2013.01); *H02P 9/107* (2013.01); *H02P 2101/15* (2015.01)

(58) Field of Classification Search
CPC ........ H02P 9/04; H02P 9/107; H02P 2101/15; H02P 9/00; Y02E 10/72
See application file for complete search history.

(56) References Cited

U.S. PATENT DOCUMENTS

2009/0008938 A1* 1/2009 Erdman ............... H02P 29/68
290/44
2014/0339830 A1  11/2014 Gupta et al.
(Continued)

FOREIGN PATENT DOCUMENTS

CN   104158225 A   11/2014
CN   105098830 A   11/2015
(Continued)

OTHER PUBLICATIONS

International Search Report and Written Opinion for PCT Application No. PCT/DK2021/050253, dated Oct. 15, 2021.
(Continued)

*Primary Examiner* — Julio C. Gonzalez
(74) *Attorney, Agent, or Firm* — Patterson + Sheridan, LLP

(57) ABSTRACT

Aspects of the present invention relate to a method for reducing high torque levels and/or high rates of change of torque in a wind turbine generator that comprises a machine-side converter and a line-side converter connected by a DC link, and, wherein the line-side converter is operated according to a virtual synchronous machine control scheme. The method comprises: determining a generator torque; determining a torque surplus indicating the amount that the generator torque exceeds a torque limit; determining an active power surplus corresponding to the torque surplus; controlling the line-side converter according to the virtual
(Continued)

synchronous machine control scheme using an input parameter configured to reduce the active power output of the line side converter by the active power surplus.

20 Claims, 5 Drawing Sheets

(51) Int. Cl.
*H02P 9/10* (2006.01)
*H02P 101/15* (2016.01)

(56) References Cited

U.S. PATENT DOCUMENTS

| | | | |
|---|---|---|---|
| 2017/0214248 A1* | 7/2017 | Rowe | H02J 3/46 |
| 2017/0235322 A1 | 8/2017 | Rahmani et al. | |
| 2019/0162165 A1 | 5/2019 | Niss et al. | |

FOREIGN PATENT DOCUMENTS

| | | | |
|---|---|---|---|
| CN | 105978042 A * | 9/2016 | H02J 3/12 |
| CN | 106130421 A | 11/2016 | |
| EP | 3089353 A1 | 11/2016 | |
| EP | 3522362 A1 | 8/2019 | |
| WO | 2020135905 A1 | 7/2020 | |

OTHER PUBLICATIONS

Danish Patent Office, Search Report for Denmark Patent Application No. PA 2020 70515, dated Feb. 23, 2021.
Danish Patent Office, Search Opinion for Denmark Patent Application No. PA 2020 70515, dated Feb. 25, 2021.
European Patent Office, Communication pursuant to Article 94(3) EPC for European Patent Application No. 21755894.9, dated Jun. 26, 2024.

* cited by examiner

METHOD FOR REDUCING HIGH TORQUE LEVELS AND TORQUE GRADIENTS IN WIND TURBINE GENERATORS

TECHNICAL FIELD

The present disclosure relates to a method for reducing high torque levels and high torque gradients in wind turbine generators, and to a power plant controller for implementing such a method. The methods relate particularly to wind turbine generators operating using virtual synchronous machine control schemes and/or configured to exhibit a virtual synchronous generator response.

BACKGROUND

In order to allow a higher penetration of renewable energy sources such as wind turbine generators into the electrical grid, some countries propose requirements to equip the power converters with grid-forming properties similar to conventional synchronous generators. These requirements can be address by configuring wind turbine generators as virtual synchronous machines or using virtual synchronous machine control schemes. Virtual synchronous machines may also be referred to as virtual synchronous generators.

One of the properties of virtual synchronous machine control is that the power contribution of a wind turbine generator is adjusted to be proportional to an angle of deviation between a grid voltage and an internal virtual rotor angle. The internal virtual rotor angle is determined by modelling a synchronous generator's reaction to a power error value.

When controlling wind turbine generators as virtual synchronous machines, jumps in voltage or phase result in changes in the difference between the angle of deviation. Large jumps in voltage or phase result in large differences and large changes to the difference. This is translated through the virtual synchronous machine control into large differences in power contribution requirements. A jump in power contribution requirements causes high torque gradients and/or high torque levels to be implemented, and therefore results in high mechanical impact to the generation system of the wind turbine generator.

High mechanical loads on the generator are undesirable. Instantaneous peak loads can cause damage, and when repeated may lead to a shortening of the lifespan of the turbine. Large torque gradients may result in damage not associated with peak loads, such oil film bearings breaking through.

It is an aim of the present invention to address one or more of the disadvantages associated with the prior art.

SUMMARY OF THE INVENTION

According to an aspect of the present invention there is provided a method for reducing high torque levels and/or high rates of change torque in a wind turbine generator. The wind turbine generator comprises a machine-side converter and a line-side converter connected by a DC link. The line-side converter is operated according to a virtual synchronous machine control scheme. The method comprises:
   determining a generator torque;
   determining a torque surplus indicating the amount that the generator torque exceeds a torque limit;
   determining an active power surplus corresponding to the torque surplus; and
   controlling the line-side converter according to the virtual synchronous machine control scheme.

The control scheme has an input parameter that is based on the active power surplus. The control scheme is configured to reduce the active power output of the line side converter by the active power surplus.

By virtual synchronous machine control scheme, it is meant that the wind turbine generator is controlled to emulate a synchronous generator, by resembling a voltage source rather than a current source towards the grid and by providing virtual inertia, and controlling the line-side converter based on a difference in phase angle between a virtual generator and the grid.

The term surplus, in reference to both the torque surplus and active power surplus, is intended to mean an excess amount when compared with a limit value that is or will be requested from the generator. That is, that the torque surplus indicates an amount of torque above a torque limit value included in the generator torque value. The surplus may be referred to as an excess torque or an over-torque. The torque surplus in the method above may be considered to be a main torque surplus to differentiate from the preliminary torque surpluses where used below.

Advantageously, by applying the above method, torque levels above a maximum torque and torque changes that exceed a maximum rate of change of torque can be avoided. The identification of the torque surplus and its use as an input parameter for controlling the line-side converter introduces a feed-forward element that enables swift reaction to potentially problematic torques. Importantly, the determination of surpluses ensures that only excess torques, i.e. torques that may cause damage, are used to alter the operation of the line side converter. Torques that are at allowable levels are passed without adjustment.

The torque limit may be based on a maximum rate of change of torque. Where the torque limit is based on a maximum rate of change of torque, the method may comprise:
   determining a rate of change of generator torque based on the determined generator torque and at least one previously determined generator torque;
   comparing the rate of change of generator torque with the maximum rate of change of torque; and
   generating the torque limit based on the comparison.

If the determined rate of change of generator torque is equal to or less than the maximum rate of change of torque, the torque limit may be set as the determined generator torque. If the determined rate of change of generator torque is greater than the maximum rate of change of torque, the torque limit may be generated by adjusting the previously determined generator torque by the integral of the maximum rate of change of torque.

The torque limit may be based on a maximum torque value. Where the torque limit is based on a maximum torque value, the method comprises:
   comparing the determined generator torque with a maximum torque value; and
   generating the torque limit based on the comparison.

If the determined generator torque exceeds the maximum torque value, the torque limit may be generated as the maximum torque value. If the determined generator torque is equal to or less than the maximum torque value, the torque limit may be generated as the determined generator torque.

The method may comprise determining at least two preliminary torque surpluses. The at least two preliminary torque surpluses may comprise a first preliminary torque surplus indicating the amount that the generator torque exceeds the torque limit that is based on the maximum rate of change of torque and a second preliminary torque surplus indicating the amount that the generator torque exceeds the torque limit that is based the maximum torque value. Where two preliminary torque surpluses are determined, determining the torque surplus may comprises determining the maximum surplus of the at least two preliminary torque surpluses.

The preliminary torque surpluses differ from the main torque surplus described above. Each preliminary torque surplus is a calculation based on a particular torque limit, so that more than one limit can be implemented. The use of preliminary torques and the selection of the maximum ensures that the generator is controlled to prevent any exceedance of the limits.

Optionally, the input parameter comprises an active power value. The active power value may be used as an input to a swing equation for the calculation of voltage angle of the virtual synchronous machine control scheme.

Alternatively, the input parameter optionally comprises an active power limit. The active power limit may be used as an input to a power limiter configured to generate active power references for the virtual synchronous machine control scheme.

In a further alternative, the input parameter optionally comprises a current limit. The current limit may be based on the active power surplus and a power network voltage level. The current limit may be used as an input to a current limiter of the virtual synchronous machine control scheme. The current limiter may be configured to implement the current limit as a virtual resistance.

The use of different input parameters brings different varying benefits. For example, the use of a current limit as the input parameter is a fast method, with the active power limit approach being less fast, and the active power value being less fast still. The implementation of an active power limit or a current limit enables interaction and implementation of a number of different schemes into the virtual synchronous machine that may not be achievable otherwise. For example, where a current limit or active power limit is already implemented, the use of these as input parameters enables easy integration, particularly into existing systems where it may not be as straightforward to redesign the modes of operation. Using the active power value, despite being least fast of the three options described here, brings additional benefits of being a direct input to the swing equation, and so having a direct effect on the output angle.

In some embodiments, the input parameter may comprise more than one value. The input parameter may comprise a combination of an active power value, an active power limit, and/or a current limit.

Determining the generator torque may comprise measuring the generator torque from the generator drivetrain.

Alternatively, determining the generator torque may comprise:
  determining an active power reference for the machine-side converter;
  determining a rotor speed; and
  calculating the generator torque based on the active power reference and rotor speed.

The active power reference may be determined based on an error value between a voltage reference signal and a measured voltage level for the DC link.

Determining the active power surplus may comprise:
  determining a rotor speed; and
  calculating the active power surplus based on the torque surplus and rotor speed.

According to another aspect of the invention, there is provided a wind turbine controller configured to implement the method described above.

According to another aspect of the invention, there is provided a computer program product comprising instructions which, when the program is executed by a computer or wind turbine controller, cause the computer or controller to carry out the steps of the method described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Generally, there is provided a method of controlling a wind turbine generator, and particularly a method of controlling a line side converter of a wind turbine generator, in order to reduce high torque levels and high torque gradients, also referred to as high rate of change of torque levels, that may be caused by virtual synchronous machine control schemes. A system is also provided. The methods and system utilise the torque level to alter the active power output of the line side converter, thus reducing the torque levels demanded of the generator at the machine-side converter and earlier in the drivetrain. Reducing high torque levels and high torque gradients ensures that the lifespan of the wind turbine generator is optimised, and that components within the generator do not fail.

Figure 1:
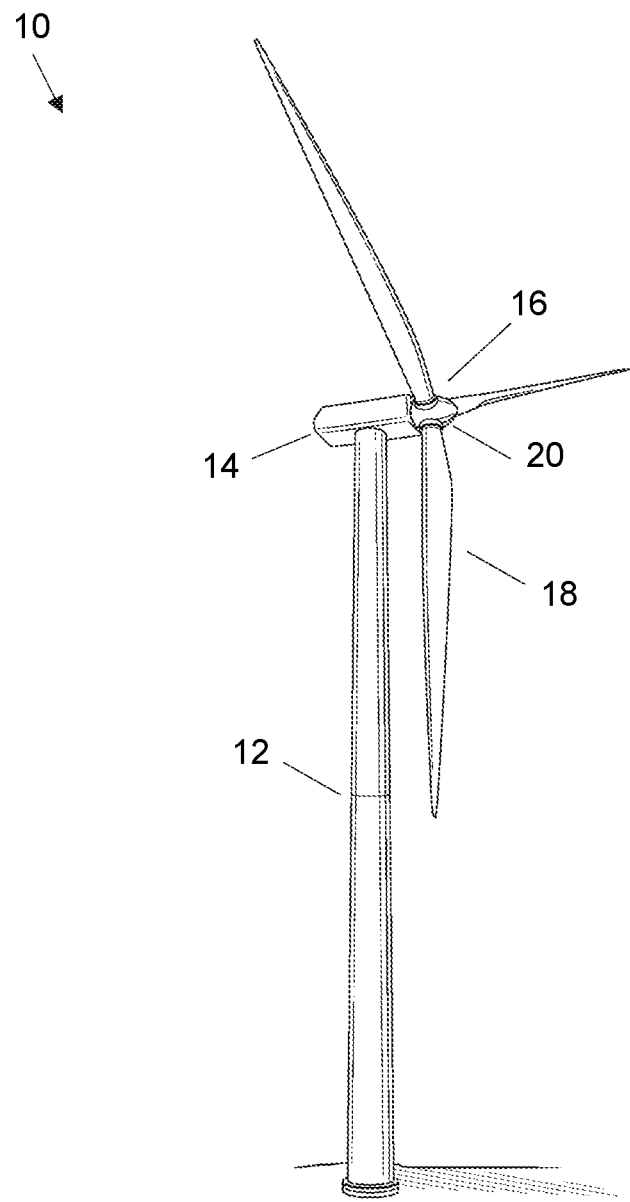
FIG. 1 shows a wind turbine generator.

FIG. 1 shows a wind turbine 10 in which an example of the invention may be incorporated. The wind turbine 10 comprises a tower 12 supporting a nacelle 14 to which a rotor 16 is mounted. The rotor 16 comprises a plurality of wind turbine blades 18 that extend radially from a hub 20. In this example, the rotor 16 comprises three blades 18 although other configurations are possible.

The rotor 16 is connected to a generator situated inside the nacelle via a drivetrain (the generator and drivetrain are not shown in FIG. 1). The rotor 16 is configured to rotate under the action of the wind on the blades 18. Rotation of the rotor 16 rotates the drivetrain and generator. The generator is configured to generate electrical power. Thus, the wind turbine 10 converts kinetic energy of the wind into mechanical energy by means of the rotor blades 18 and, subsequently, into electric power by means of the generator.

Figure 2:
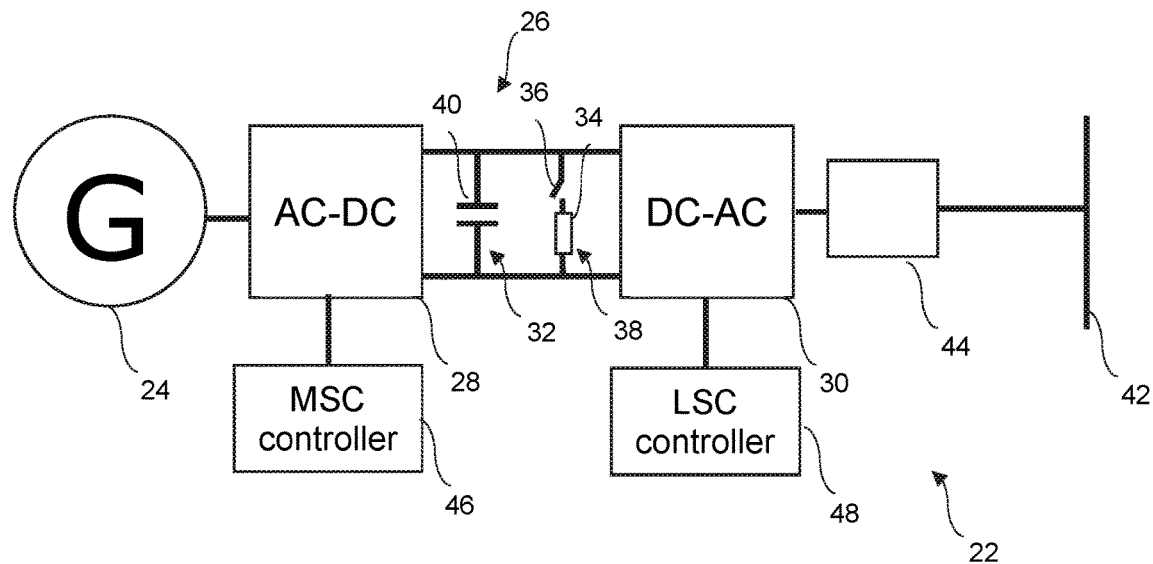
FIG. 2 shows a schematic representation of a generating system of the wind turbine generator of FIG. 1.

FIG. 2 shows an example of a power generating system 22 including the generator 24. The generator is connected with a power converter 26 which comprises a generator side converter 28 and a line side converter 30. The generator side converter 28, which may also be referred to as a machine side converter or MSC, converts AC power generated by a rotating armature of the generator 24 into DC power. The line side converter 30 converts the DC power into an AC power for supply to a power grid to which the wind turbine generator 10 is connected.

The power converter 26 also includes a DC-link 32 and a resistor 34 connected with a controllable switch 36. The resistor and switch forms a power dissipation device, also known as a chopper 38, for dissipating active power. The DC-link 32 comprises one or more DC-link capacitors 40 which are charged by the DC output current from the generator side converter 28 and which supplies DC power to the line side converter 30. The output AC current from the line side converter 30 is supplied to a power output line 42 for supply to the wider power network. One or more further components 44 may be provided between the line side converter 30 and the output line 42 to transform, adjust, or filter the output before it is supplied to the network. For example, the further components 44 may comprise output inductors, a wind turbine transformer, and/or harmonic filter capacitors, among other components.

As will be appreciated, the power output line 42 may be a medium voltage power bus which receives power from other wind turbine generators forming a renewable energy power plant, or may be connected with a high voltage network, e.g. via further transformers. The power converter may be full-scale converter configured according to different principles including forced-commutated and line-commutated converters.

In order to respond to commands from a power plant controller and to supply power in a response manner, the wind turbine generator 10 comprises a control system. The control system includes at least a machine side converter controller (MSC converter) 46 and a line side converter controller (LSC converter) 48. The controllers 46, 48 control respective converters 28, 30, typically by controlling the pulse wave modulation of the converters 28, 30, to control the amount of active power P and reactive power Q generated by the wind turbine generator 10.

The wind turbine generator 10, in the embodiments discussed herein, is controlled according to a virtual synchronous machine (VSM) control scheme. The VSM control scheme is a protocol for controlling the converters of the wind turbine generator to mimic or simulate a synchronous generator. Based on a measured grid voltage, an angle is calculated for the virtual synchronous machine. The angle, which may be referred to as θVSM, is used to control the power output of the line side converter 30, based on a difference between the angle of the VSM and a grid angle. The VSM angle is generated based on a swing equation of the VSM.

The VSM acceleration (the double-time derivative of θVSM) indicates a difference between a power reference for a desired power output of the wind turbine and a grid power supplied by the wind turbine to a power grid. Accordingly, control of the converters according to the angle ensures that the power output of the wind turbine matches with a grid requirement.

The VSM angle VSM may be used to transform the signals between rotating and non-rotating frames, such as between a $V_{Z\theta}$ frame or a DQ frame (rotating) and a an αβ frame or an abc frame (non-rotating). Based on the synchronous machine angle θVSM and a voltage magnitude reference Vqref, control signals for the desired active power and reactive power are determined and communicated to the pulse width modulators of the line-side converter 30.

The line-side converter 30 is consequently controlled to vary its active and reactive power outputs according to the change in the difference between the angles and the voltage magnitude reference.

To maintain the voltage levels of the DC link 32, the power flows into and out of the DC link 32 are maintained at a substantially equal level. As the line-side converter 30 is responsible for implementing a power output relative to a desired voltage angle, and thus controls active power according to a reference value, the machine-side converter 28 acts to match the active power flowing out of the DC link 32 to maintain the voltage level of the DC link 32. Differences in power into and out of the DC link 32 cause changes in the voltage levels across the DC link 32.

In order to supply power into the DC link 32 and prevent voltage change across the DC link 32, the machine-side converter 28 is controlled according to a power reference generated by a DC link controller (not shown in FIG. 2). The DC link controller determines a difference between a DC link reference voltage and a DC link measured voltage, and generates a power reference accordingly.

In conventional systems, this control stemming from the control of the line-side converter may cause high torque and high rates of change of torque to be imposed on the generator. For example, where the grid conditions change and a phase jump or voltage drop is experienced, the difference in the angles changes. A sudden change in angle results in a sudden change in power reference at the line-side converter. Accordingly, in order to maintain the voltage across the DC link, the machine-side converter also has to implement a similar change in power reference. Large jumps in power reference and hence the power demanded from the generator may lead to high torques and high torque rates of change of torque being translated through the drivetrain and generation system of the wind turbine. Power generation is directly proportional to torque at constant rotational speed. As the speed of the generator is not controllable, the torque is controlled to change the power through the converter, typically by modifying the power reference or pitching the blades differently depending upon whether the production of the generator is below rated power or at rated power. Accordingly, sudden power requirement changes lead to sudden changes in loads on the blades and turbine to implement a sudden torque increase to match the power requirement. High torques and rates of change of torque may lead to damage to the components in the drivetrain.

Figure 3:
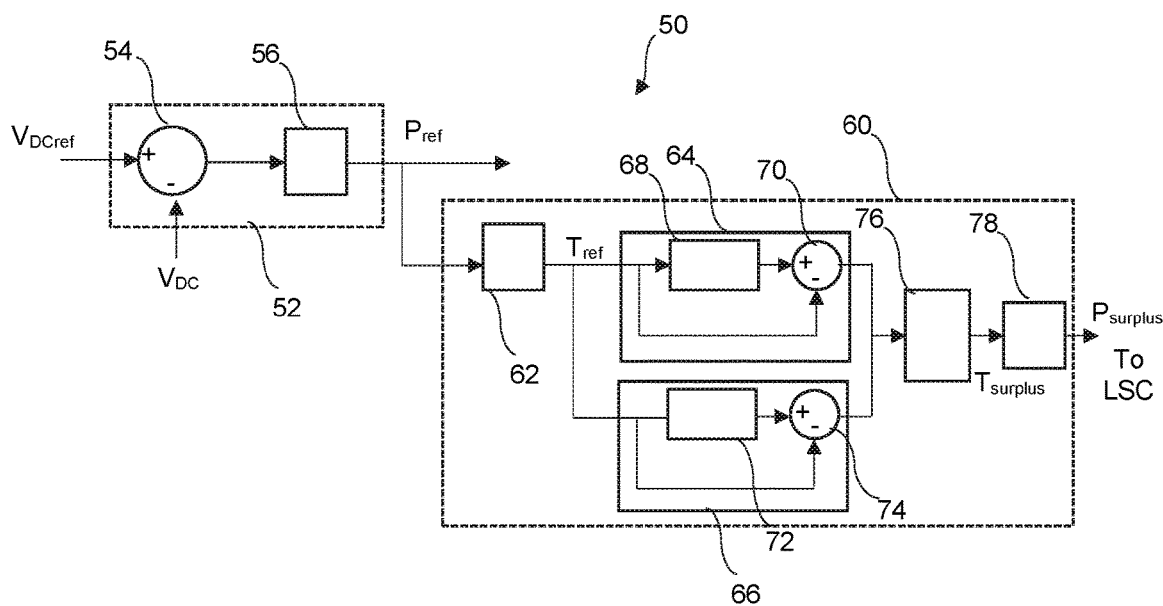
FIG. 3 shows a control system block diagram for part of a DC link voltage controller of the generating system of FIG. 2.
Figure 4:
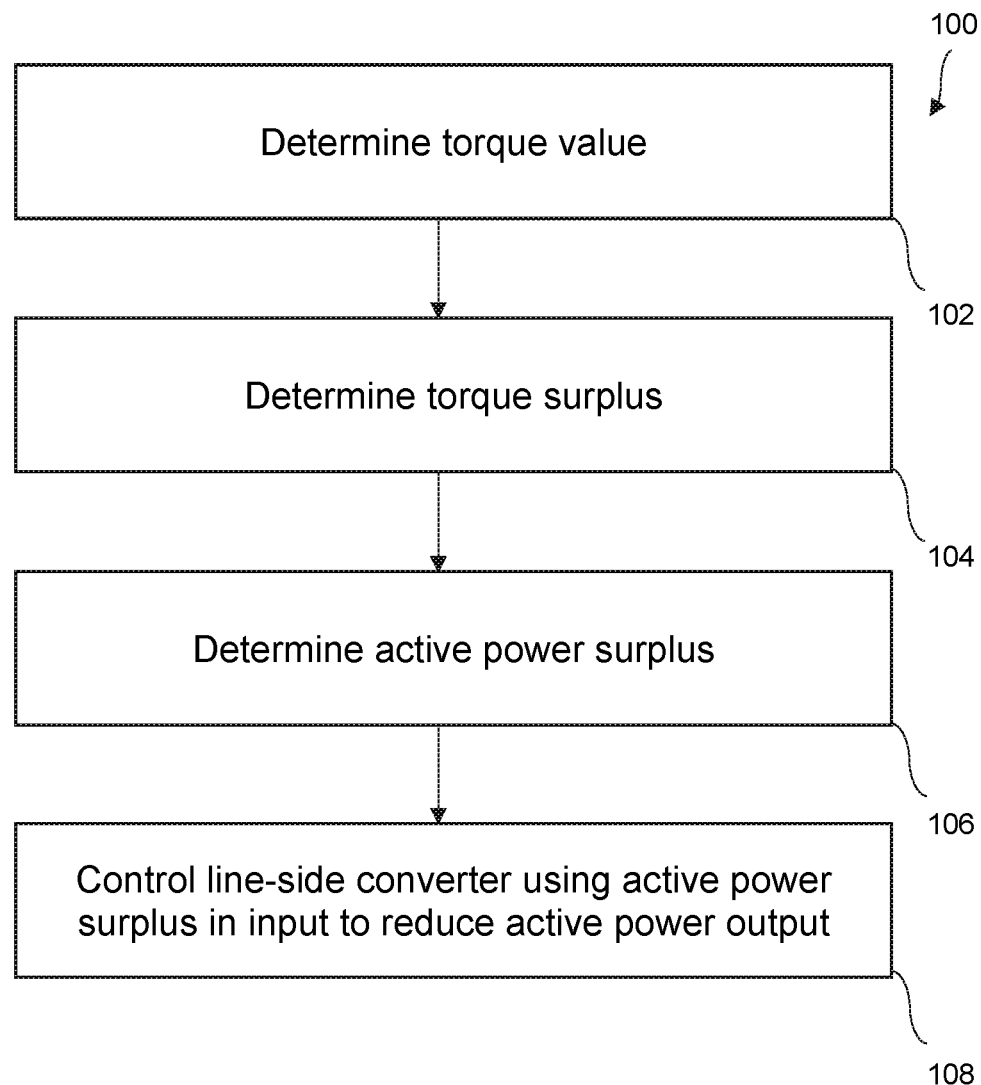
FIG. 4 shows a flow chart of a method for reducing high torque levels and torque gradients in the wind turbine generator.

In order to counteract this effect, the system 50 of FIG. 3 and the method 100 of FIG. 4 have been devised. The system 50 and method 100 monitor the power reference for the machine-side converter 46 established based on the DC link voltage to identify potentially damaging changes in torque and rate of change of torque, and feed-forward a signal to the line-side converter 48 to reduce parameters based on the potentially damaging torque levels. For convenience, rates of change of torque will be referred to hereafter as torque gradients.

In FIG. 3, beginning at the left-hand side, the DC link controller 52, which may also be referred to as the DC link voltage controller or more simply the voltage controller, is provided as part of the machine-side converter controller 46. The DC link voltage controller 52 receives a measured voltage level across the DC link 32, $V_{DC}$, and a DC link reference voltage, $V_{DCref}$. At the difference junction 54 within the DC link voltage controller 52, a difference between these values is determined to provide an error value. Using a PI controller 56, the error value is converted to a power reference, $P_{ref}$. The power reference is subsequently used to control the machine-side converter 46. As this application is not concerned with the control of the machine-side converter, the machine-side converter controller after the generation of this power reference is not depicted in detail or discussed further.

According to the invention, a high torque module 60 is provided. The high torque module 60 also receives the power reference generated by the DC link voltage controller 52. The power reference is converted to a torque value, $T_{ref}$, at block 62, by dividing the power reference by the rotational speed of the generator, which may also be referred to as the rotor speed. The rotor speed may be determined using a rotor speed sensor, such as a tachometer, or a speed observer as would be familiar to the skilled person.

The power reference from the DC link voltage controller 52 is used to effectively preempt the high torque values. The system identifies power references that will cause high power changes and reduces them at the line-side converter before the torques are translated through the drivetrain. This is the reason for using the DC link voltage controller value—the high power reference values may be identified before they are implemented. In other embodiments, a measured torque may be utilised or other parameters or values from which the torque can be derived.

Returning to FIG. 3, from the determined torque value, a torque surplus is determined. A torque surplus is an amount of torque in excess of a torque limit. The torque surplus may be zero, if the torque does not exceed the torque limit, and may be a positive value if the torque does exceed the limit.

As shown in FIG. 3, the surplus torque is identified according to two tests. In a first test 64, indicated by the upper box, a torque gradient is determined and compared with a torque gradient limit, i.e. a maximum rate of change of torque, to determine the surplus torque. In a second test 66, indicated by the lower box, the torque value is compared directly with a torque limit to determine the surplus torque. By these two tests, any potentially damaging torque changes are avoided.

In the first test, the torque value is passed through a limiting block 68. In limiting block 68, a torque gradient is calculated based on the determined torque value and one or more earlier determined torque values. The torque gradient is compared with a torque gradient limit. If the torque gradient does not exceed the torque gradient limit, the output of the block is the torque value. If the torque gradient exceeds the torque gradient limit, the output of the block 68 is a new torque value calculated based on the earlier torque value and an allowable rate of change of torque, i.e. the torque gradient limit.

The output of the limiting block 68 is passed to a difference junction 70 to determine a first preliminary surplus, where the difference between the original torque value and the output of the block is calculated. If the torque gradient did not exceed the gradient limit, the output of the difference junction 70 is zero, as the output of block 68 is the same as the torque value. If the gradient limit was exceeded, a positive first preliminary torque surplus value is output from the difference junction 70.

In the second test, the torque value is passed through a limiting block 72. The torque value is compared with a torque limit, which is a maximum or peak torque value. If the torque value does not exceed the torque limit, the output of the block 72 is the torque value. If the torque value exceeds the torque limit, the output of the block 72 is the torque limit.

The output of the limiting block is passed to a difference junction 74 to determine a second preliminary surplus, where the difference between the original torque value and the output of the block 72 is calculated. If the torque value did not exceed the limit, the output of the difference junction 74 is zero, as the output of block 72 is the same as the torque value. If the limit was exceeded, a positive second preliminary torque surplus value is output from the difference junction 74.

The two preliminary torque surplus values, whether they are zero or a positive value, are passed to block 76 at which the maximum of the two values is determined. The maximum value is the torque surplus value, $T_{surplus}$.

From the torque surplus value, an active power surplus value is derived by multiplying by the rotational speed at block 78. The active power surplus, $P_{surplus}$ is subsequently utilised as an input parameter to the line-side converter, as depicted by the arrow 80. The active power surplus is used to control the line-side converter to reduce particular values that cause high torques to be required.

The active power surplus, $P_{surplus}$, may be used as an input to the line-side converter in one or more ways, as will be described below. Before that, FIG. 4 will briefly be discussed.

FIG. 4 shows a general method 100 of operation of the torque module. As will be appreciated from the above discussion, the method generally comprises the steps 102, 104, 106, and 108 of: determining a generator torque, which may either be a calculated generator torque based on rotor speed and a power reference, measured generator torque, or otherwise; determining a torque surplus indicating the amount that the generator torque exceeds a torque limit; determining an active power surplus corresponding to the torque surplus; and controlling the line-side converter according to the virtual synchronous machine control scheme, the control scheme having an input parameter that is based on the active power surplus and configured to reduce the active power output of the line side converter by the active power surplus.

As may be noted, the method 100 of FIG. 4 is a general method compared to the embodiment of FIG. 3. As indicated in the method 100, the tests performed to determine the torque surplus may be based on a number of parameters and limits. So, while the embodiment of FIG. 3 shows two tests 64, 66, it will be appreciated that only one of the tests may be performed, or that more than two tests may be performed.

Considering now the use of the active power surplus, this value is generally used to reduce the active power output of the line side converter. Reducing this output value ensures that the power demanded from the machine side converter is also reduced, and so high torque gradients and torque values are avoided.

Figure 5:
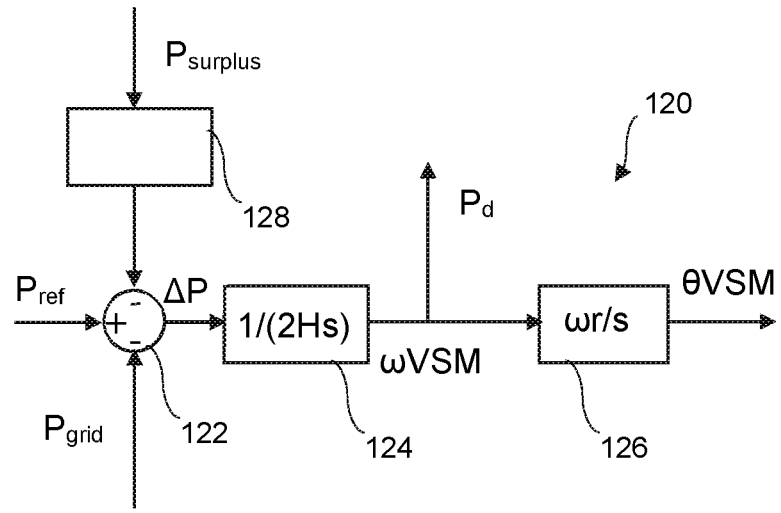
FIGS. 5 to 7 show examples of control systems for implementing a virtual synchronous machine control scheme.
Figure 6:
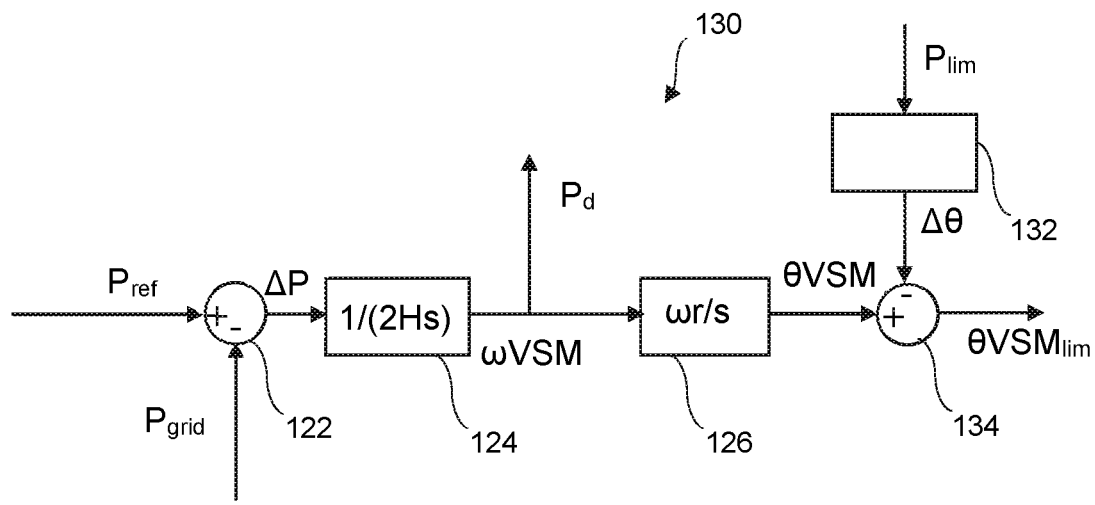
Figure 7:
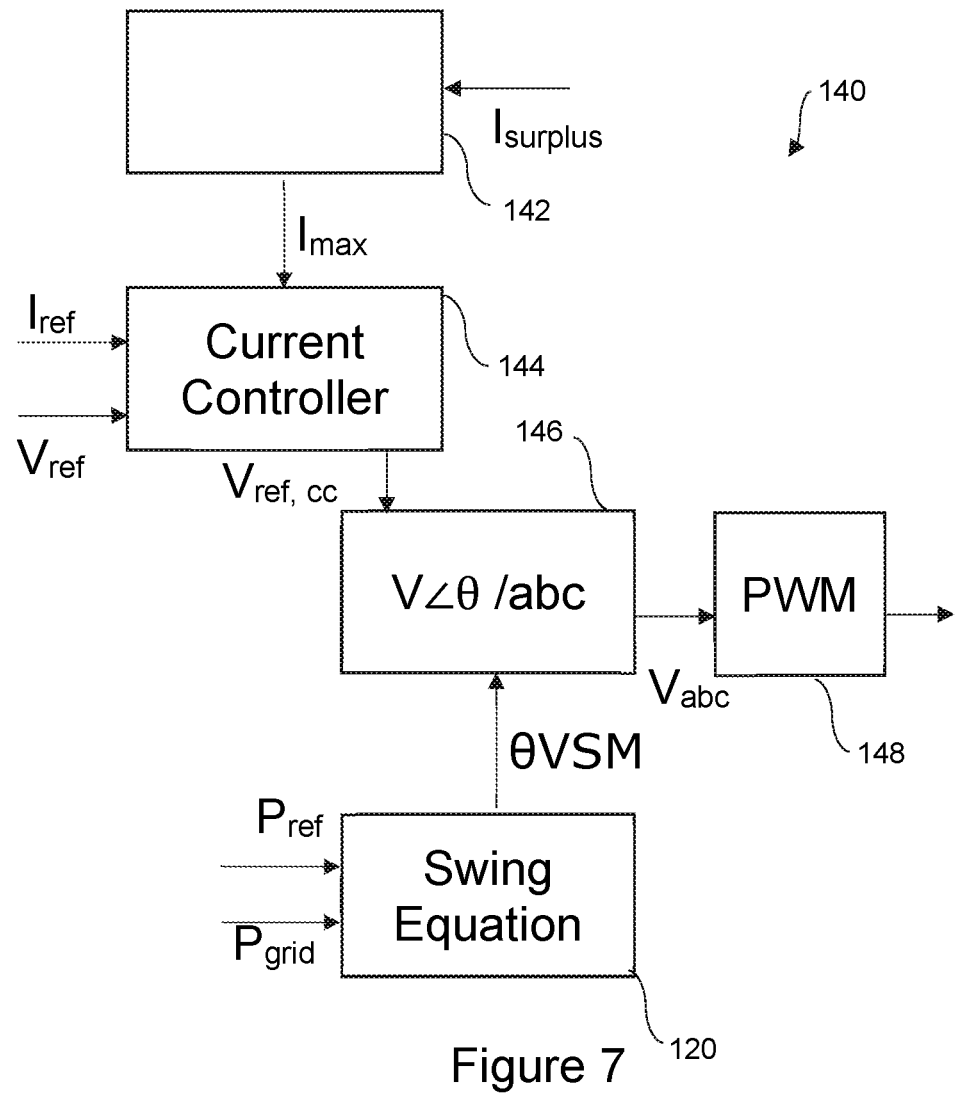

FIGS. 5 to 7 show three different examples of how the active power surplus may be used as an input to the virtual synchronous machine control scheme of the line side converter to reduce the active power output of the line side converter.

In a first example, which is explained with reference to FIG. 5, the input to the line side converter from the torque module is the active power surplus, $P_{surplus}$. The active power surplus is used as an input parameter without any further change or calculations. The active power surplus input to the swing equation for the calculation of voltage angle of the virtual synchronous machine control scheme.

An example of the swing equation and its implementation is shown in the control system 120 of FIG. 5. In FIG. 5, a power error $\Delta P$ is determined at the junction 122 as the difference $P_{ref}-P_{grid}-P_{surplus}$. $P_{ref}$ is a power reference for the desired active power output of the wind turbine, $P_{grid}$ is a value for the grid power, $P_{surplus}$ is the surplus active power value. A further parameter, $P_d$, may also be subtracted at this junction 122, although it is not shown here for clarity. $P_d$ comprises other input power terms, such as a damping power fed back from the swing equation. In some embodiments, the grid power $P_{grid}$ may be determined elsewhere and adjusted based on a virtual power calculated based on a virtual resistance. Under steady state conditions, the value of the power error $\Delta P$ is zero, because the power reference value is equal to the grid power, and any feedback or feedforward power adjustments, including the surplus power, are zero also.

In FIG. 5, the active power surplus value is passed through an optional filter 128 prior to being used at the junction 122. The filter 128 is configured to correct lag introduced by the rotor emulation.

In response a change in the power reference or the grid power, the power error $\Delta P$ becomes non-zero, which causes the angle $\theta VSM$ to increase or decrease to reduce the power error $\Delta P$. In response to fluctuations in the power reference or the grid power, the synthetic inertial response value becomes non-zero, which causes the virtual machine to either accelerate or decelerate to reach a new equilibrium condition. The new equilibrium is reached when the grid power $P_{grid}$ is again following $P_{ref}$.

By directly injecting the surplus active power value into this part of the swing equation, the change in error value is mitigated to prevent torque values from exceeding the limit or from rising faster than the maximum rate of change of torque.

Subsequent to calculating the error, the virtual synchronous machine rotational speed $\omega VSM$ is determined based on the power error and an inertial integration model 124. The inertial integration model 124 is implemented as $1/(2Hs)$ where H is the inertia time constant and $1/s$ is the integration in s-domain. Since the derivative of the synchronous machine rotational speed $\omega VSM$ is proportional to the deviation between the power reference Pref and the grid power Pgrid, the integration of the difference $\Delta P$ gives the synchronous machine rotational speed $\omega VSM$.

The synchronous machine angle $\theta VSM$ is determined based on an integration of the synchronous machine rotational speed $\omega VSM$ according to $\omega r/s$ at block 126, where $\omega r$ is the rated synchronous generator speed.

In a second example, which is explained with reference to FIG. 6, the input to the line side converter from the torque module comprises an active power limit. The active power surplus is input as an upper limit to a limiting block through which power references for the virtual synchronous machine angle calculation are passed. Once the power references have passed through the limiter, the output is input to the swing equation.

FIG. 6 shows a system diagram 130 that illustrates this second example. FIG. 6 generally shows the swing equation as in FIG. 5, and so like elements have been numbered with the same reference numerals. The difference from FIG. 5 is that there is not an input of an active power surplus parameter to the junction 122. Instead, the implementation of FIG. 6 utilises the active power limit to modify the virtual synchronous machine angle. As can be seen in FIG. 6, a limiting block 132 is provided, and the input to the limiting block 132 is a power limit $P_{lim}$ calculated by subtracting the surplus value from the power reference for the machine-side converter. Thus, the maximum allowable power is calculated and input as a limit. The power limit passes through the limiting block 132 that determines a change in angle value, $\Delta\theta$. The change in angle value may be determined based on a active power measured or feedback signal, an inductive reactive value, and voltage values. An example of the use of a power limit to generate an angle change value is discussed in 'A VSM (Virtual Synchronous Machine) Convertor Control Model Suitable for RMS Studies for Resolving System Operator/Owner Challenges', Roscoe, Andrew & Yu, Mengran & Dyśko, Adam & Booth, Campbell & Ierna, Richard & Zhu, Jiebei & Urdal, Helge, 15th Wind Integration Workshop, Vienna, 2016.

Once the change in angle value has been determined, at junction 134, it is subtracted from the VSM angle $\theta VSM$, to provide a limited VSM angle $\theta VSM_{lim}$, which is subsequently used to control the line-side converter.

In some embodiments, the power limit may also be used to directly limit the power reference value input to the junction 122.

In a third example, which is explained with reference to FIG. 7, the input to the line side converter controller from the torque module comprises a current limit. The current limit is generated based on the active power surplus value and a power network voltage level. The current limit is input to a current limiter of the line-side converter control system.

FIG. 7 shows an example of the control system 140 of the line-side converter. In this diagram, the swing equation is labelled 120, and receives a power reference, $P_{ref}$ and measured power level, $P_{grid}$, to generate a virtual synchronous machine angle $\theta VSM$. A current controller 142 generates a current-controlled voltage reference level, $V_{ref,\,cc}$, based on a received voltage reference, $V_{ref}$ a current reference, $I_{ref}$, and maximum current value, $I_{max}$. At the block labelled 144, the voltage reference level and angle are transformed from a rotating frame into a non-rotating frame to generate a voltage level, $V_{abc}$, for input to the pulse width modulator 146. The pulse width modulator (PWM) 146 then controls the line-side converter accordingly.

In this embodiment, the active power surplus is converted to a current surplus, $I_{surplus}$, by dividing the active power surplus by the absolute grid voltage. The current surplus is provided as input to block 148, which generates the maximum current value $I_{max}$ for input to the current controller 142 based on the current surplus value. The current controller subsequently modifies the voltage reference based on the maximum current value. For example, the maximum current value may be based on a measured current value limited based on the surplus value, or a measured current value from which the surplus is subtracted.

In some embodiments, the maximum current value may be implemented as a virtual resistance.

It will be appreciated that various changes and modifications can be made to the present invention without departing from the scope of the present application.

The invention claimed is:

1. A method for reducing high torque levels and/or high rates of change of torque in a wind turbine generator that comprises a machine-side converter and a line-side converter connected by a DC link, and, wherein the line-side converter is operated according to a virtual synchronous machine control scheme, the method comprising:
- determining a generator torque;
- determining a torque surplus indicating an amount that the generator torque exceeds a torque limit, wherein the torque limit is generated based on a comparison between a rate of change of generator torque with a maximum rate of change of torque, with the rate of change of generator torque being determined based on the determined generator torque and at least one previously determined generator torque;
- determining an active power surplus based on the torque surplus; and
- controlling the line-side converter according to the virtual synchronous machine control scheme, the control scheme having an input parameter that is based on the active power surplus and configured to reduce an active power output of the line-side converter by the active power surplus.

2. The method of claim 1, wherein:
- when the determined rate of change of generator torque is equal to or less than the maximum rate of change of torque, the torque limit is set as the determined generator torque, and
- when the determined rate of change of generator torque is greater than the maximum rate of change of torque, the torque limit is generated by adjusting the previously determined generator torque by an integral of the maximum rate of change of torque.

3. The method of claim 1, wherein the torque limit is based on a maximum torque value.

4. The method of claim 3, further comprising:
- comparing the determined generator torque with the maximum torque value; and
- generating the torque limit based on the comparison, wherein:
  - when the determined generator torque exceeds the maximum torque value, the torque limit is generated as the maximum torque value; and
  - when the determined generator torque is equal to or less than the maximum torque value, the torque limit is generated as the determined generator torque.

5. The method of claim 3, further comprising:
- determining at least two preliminary torque surpluses, the preliminary torque surpluses comprising a first preliminary torque surplus indicating an amount that the generator torque exceeds the torque limit that is based on the maximum rate of change of torque and a second preliminary torque surplus indicating an amount that the generator torque exceeds the torque limit that is based the maximum torque value, and wherein:
- determining the torque surplus comprises determining a maximum surplus of the at least two preliminary torque surpluses.

6. The method of claim 1, wherein the input parameter comprises an active power value, and wherein the active power value is used as an input to a swing equation for a calculation of a voltage angle of the virtual synchronous machine control scheme.

7. The method of claim 1, wherein the input parameter comprises an active power limit, and wherein the active power limit is used as an input to a power limiter configured to generate active power references for the virtual synchronous machine control scheme.

8. The method of claim 1, wherein the input parameter comprises a current limit based on the active power surplus and a power network voltage level, and wherein the current limit is used as an input to a current limiter of the virtual synchronous machine control scheme.

9. The method of claim 8, wherein the current limiter is configured to implement the current limit as a virtual resistance.

10. The method of claim 1, wherein determining the generator torque comprises measuring the generator torque from a generator drivetrain.

11. The method of claim 1, wherein determining the generator torque comprises:
- determining an active power reference for the machine-side converter;
- determining a rotor speed; and
- calculating the generator torque based on the active power reference and rotor speed.

12. The method of claim 11, wherein the active power reference is determined based on an error value between a voltage reference signal and a measured voltage level for the DC link.

13. The method of claim 1, wherein determining the active power surplus comprises:
- determining a rotor speed; and
- calculating the active power surplus based on the torque surplus and rotor speed.

14. A wind turbine controller, comprising:
- an input/output (I/O) interface;
- one or more processors programmed to perform an operation for reducing high torque levels and/or high rates of change of torque in a wind turbine generator that comprises a machine-side converter and a line-side converter connected by a DC link, and, wherein the line-side converter is operated according to a virtual synchronous machine control scheme, the operation comprising:
- determining a generator torque;
- determining a torque surplus indicating an amount that the generator torque exceeds a torque limit, wherein the torque limit is generated based on a comparison between a rate of change of generator torque with a maximum rate of change of torque, with the rate of change of generator torque being determined based on the determined generator torque and at least one previously determined generator torque;
- determining an active power surplus based on the torque surplus; and
- controlling the line-side converter according to the virtual synchronous machine control scheme, the control scheme having an input parameter that is based on the active power surplus and configured to reduce an active power output of the line side converter by the active power surplus.

15. The wind turbine controller of claim 14, wherein:
- if the determined rate of change of generator torque is equal to or less than the maximum rate of change of torque, the torque limit is set as the determined generator torque, and
- if the determined rate of change of generator torque is greater than the maximum rate of change of torque, the torque limit is generated by adjusting the previously determined generator torque by the integral of the maximum rate of change of torque.

16. The wind turbine controller of claim 14, wherein the torque limit is based on a maximum torque value.

17. The wind turbine controller of claim 16, wherein the operation further comprises:

comparing the determined generator torque with a maximum torque value; and generating the torque limit based on the comparison, wherein:

if the determined generator torque exceeds the maximum torque value, the torque limit is generated as the maximum torque value; and if the determined generator torque is equal to or less than the maximum torque value, the torque limit is generated as the determined generator torque.

18. The wind turbine controller of claim 16, wherein the operation further comprises:

determining at least two preliminary torque surpluses, the preliminary torque surpluses comprising a first preliminary torque surplus indicating an amount that the generator torque exceeds the torque limit that is based on the maximum rate of change of torque and a second preliminary torque surplus indicating an amount that the generator torque exceeds the torque limit that is based the maximum torque value, and wherein:

determining the torque surplus comprises determining a maximum surplus of the at least two preliminary torque surpluses.

19. The wind turbine controller of claim 14, wherein the input parameter comprises an active power limit, and wherein the active power limit is used as an input to a power limiter configured to generate active power references for the virtual synchronous machine control scheme.

20. A wind turbine, comprising:

a wind turbine generator having a machine-side converter and a line-side converter connected by a DC link; and a wind turbine controller configured to control operation of the line-side converter according to a virtual synchronous machine control scheme, comprising:

determining a generator torque;

determining a torque surplus indicating an amount that the generator torque exceeds a torque limit, wherein the torque limit is generated based on a comparison between the determined generator torque and a maximum torque value such that: i) when the determined generator torque exceeds the maximum torque value, the torque limit is generated as the maximum torque value; and ii) when the determined generator torque is equal to or less than the maximum torque value, the torque limit is generated as the determined generator torque;

determining an active power surplus based on the torque surplus; and controlling the line-side converter according to the virtual synchronous machine control scheme, the control scheme having an input parameter that is based on the active power surplus and configured to reduce an active power output of the line-side converter by the active power surplus.

* * * * *